United States Patent
Smith et al.

[11] 3,856,839
[45] Dec. 24, 1974

[54] ALKANEDIOXY TITANIUM CHELATES

[75] Inventors: Stanley D. Smith, Ballston Lake; Stephen B. Hamilton, Jr., Schenectady, both of N.Y.

[73] Assignee: General Electric Company, Waterford, N.Y.

[22] Filed: Nov. 22, 1972

[21] Appl. No.: 308,673

Related U.S. Application Data

[63] Continuation of Ser. No. 104,484, Jan. 6, 1971, abandoned.

[52] U.S. Cl............ 260/429.5, 252/431 R, 260/25, 260/429 J
[51] Int. Cl. .............................................. C07f 7/28
[58] Field of Search...................... 260/429.5, 429 J

[56] References Cited
UNITED STATES PATENTS

| | | | |
|---|---|---|---|
| 3,017,282 | 1/1962 | Brill ............................ | 260/429.5 X |
| 3,153,000 | 10/1964 | Takimoto et al................. | 260/429 J |
| 3,679,721 | 7/1972 | Brook et al..................... | 260/429.5 |

OTHER PUBLICATIONS
Chemical Abstracts, Vol. 68, 56105, (1968).
Feld and Cowe, The Organic Chemistry of Titanium, Butterworths, Washington pp. 66 & 67 (1965).

*Primary Examiner*—H. Sneed
*Attorney, Agent, or Firm*—Donald J. Voss, Esq.; George B. Finnegan, Jr.; Rocco S. Barrese

[57] ABSTRACT
Alkanedioxy titanium chelates have the formula:

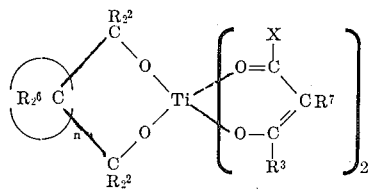

wherein $R^2$ is a radical selected from the group consisting of hydrogen, hydrocarbyl having not more than about 8 carbon atoms, carboxyalkyl and halohydrocarbyl having not more than about 8 carbon atoms and the total number of carbon atoms in the $R^2$ and $R^6$ substituted alkanedioxy radical is not more than about 18, $R^3$ is a radical having not more than about 8 carbon atoms selected from the group consisting of hydrocarbyl, halohydrocarbyl and cyano lower alkyl, $R^6$ can be selected from the same group as $R^2$ and in addition can be halo, cyano, nitro, carboxy ester, acyl and hydrocarbly substituted by halo, cyano, nitro, carboxy ester and acyl, $R^7$ is selected from the group consisting of hydrogen, hydrocarbyl, halohydrocarbyl, acyl, and taken together with $R^3$ can form together with the carbon atoms to which they are attached cyclichydrocarbon substituents and chloro, nitro, acyl, cyano and carboxy ester substituted cyclic hydrocarbon substituents; X is a radical selected from the group consisting of hydrocarbyl, halohydrocarbyl, cyanoalkyl, alkoxy, haloalkoxy, cyanoalkoxy and amino, and $n$ has a value of 0 to 8, and when X is methyl the alkanedioxy substituent is other than an ethanedioxy or a 2,2-dimethyl-1,3-propanedioxy substituent.

When mixed with methyltrimethoxysilane and a silanol chain-stopped polydiorganosiloxane fluid, these chelates catalyze the cure of the composition to a rubbery solid elastic state when exposed to atmospheric moisture.

3 Claims, No Drawings

ALKANEDIOXY TITANIUM CHELATES

This application is a continuation of application Ser. No. 104,484, filed Jan. 6, 1971 and now abandoned.

BACKGROUND OF THE INVENTION

This invention pertains to alkanedioxy titanium chelates. These materials are useful as catalysts in non-corrosive one-package silicone room temperature valcanizable compositions.

The prior art catalysts which have been used in non-corrosive one-package room temperature vulcanizable silicone compositions have resulted in thickening of the room temperature vulcanizable compositions upon the incorporation of the catalyst. The thickening has resulted in the composition being hard to work with and package. In addition, the prior art compositions while of acceptable tensile strength for many uses were not of optimum tensile strength. This has resulted in rupture of the adhesive under severe strain. In addition, the commercial prior art compositions while relatively non-corrosive were not completely non-corrosive. The disadvantage, of course, is due to the emission of slightly corrosive by-products which cause discoloration and some damage in the circuitry when used in electronic components. Corrosion of fine wire changes the impedance and resistance of the circuits.

SUMMARY OF THE INVENTION

The alkanedioxy titanium chelates of the present invention have the formula:

(1) 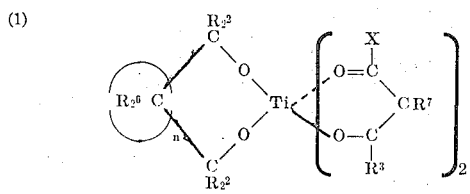

The alkanedioxy titanium chelates are particularly effective as catalysts in RTV compositions made by mixing the titanium chelate, methyltrimethoxysilane and a silanol chain-stopped polydimethylsiloxane having a viscosity of about 10,000 centripoises.

In the above formula, $R^2$ is a radical selected from the group consisting of hydrogen, hydrocarbyl having not more than about 8 carbon atoms, carboxyalkyl and halohydrocarbyl having not more than about 8 carbon atoms and the total number of carbon atoms in the $R^2$ and $R^6$ substituted alkanedioxy radical is not more than about 18, $R^3$ is a radical having not more than about 8 carbon atoms selected from the group consisting of hydrocarbyl, halohydrocarbyl and cyano lower alkyl, $R^6$ can be selected from the same group as $R^2$ and in addition can be halo, cyano, nitro, carboxy ester and acyl, $R^7$ is selected from the group consisting of hydrogen, hydrocarbyl having not more than about 8 carbon atoms, halohydrocarbyl having not more than about 8 carbon atoms, acyl having not more than about 8 carbon atoms, and taken together with $R^3$ can form together with the carbon atoms to which they are attached cyclic hydrocarbon substituents of not more than about 12 carbon atoms and chloro, nitro, acyl, cyano and carboxy ester substituted cyclic hydrocarbon substituents; X is a radical selected from the class consisting of radicals having not more than about 8 carbon atoms selected from the group consisting of hydrocarbyl, halohydrocarbyl, cyanoalkyl, alkoxy, haloalkoxy, cycanoalkoxy, and amino and $n$ has a value of 0 to 8.

The term hydrocarbyl as used here means a hydrocarbon from which one hydrogen atom has been removed, i.e., a monovalent hydrocarbon radical.

The abbreviation RTV as used here means a room temperature vulcanizable material.

When the alkanedioxy titanium chelates of the present invention are used in RTV's based on methyltrimethoxysilane and a silanol stopped fluid, the corrosion problems and the thickening and thinning problems and the lack of the tensile strength found in the prior art room temperature vulcanizable materials are overcome. This is especially true when ethylacetoacetate is used as the chelating agent.

DESCRIPTION OF THE PREFERRED EMBODIMENTS

In the alkanedioxy titanium chelate of the present invention, (1) 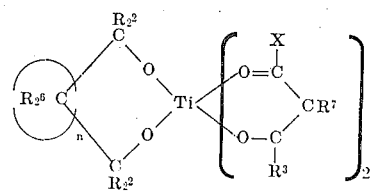

$R^2$ can be, for example, mononuclear aryl, such as phenyl, benzyl, tolyl, xylyl and ethylphenyl; halogen-substituted mononuclear aryl, such as 2,6-dichlorophenyl, 4-bromophenyl, 2,5-difluorophenyl, 2,4,6-trichlorophenyl and 2,5-dibromophenyl; alkyl such as methyl, ethyl, n-propyl, isopropyl, n-butyl, sec-butyl, isobutyl, tert-butyl, amyl, hexyl, heptyl, octyl; alkenyl such as vinyl, allyl, n-butenyl-1, n-pentenyl-2, n-hexenyl-2, 2,3-dimethylbutenyl-2, n-heptenyl; alkynyl such as propargyl, 2-butynyl; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 1,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-dichloromethylheptyl, chlorooctyl, bomooctyl, iodooctyl, 1,4-dichloromethylhexyl, 2,4-dichlorooctyl, 2,4,4-trichloromethylpentyl, 1,3,5-tribromooctyl; haloalkenyl such as chlorovinyl, bromovinyl, chloroallyl, bromoallyl, 3-chloro-n-butenyl-1, 3-chloro-n-pentenyl-1, 3-fluoro-n-heptenyl-1, 1,3,3,-trichloro-n-heptenyl-5, 1,3,5-trichloro-n-octenyl-6, 2,3,3,-trichloromethylpentenyl-4; haloalkynyl such as chloropropargyl, bromopropargyl, cycloalkyl, cycloalkenyl and alkyl and halogen-substituted cycloalkyl nd cycloalkenyl such as cyclopentyl, cyclohexyl, cycloheptyl, cyclooctyl, 6-methylcyclohexyl, 3,4-dichlorocyclohexyl, 2,6-dibromocycloheptyl, 1-cyclopentenyl, 3-methyl-1-cyclopentenyl, 3,4-dimethyl-1-cyclopentenyl, 5-methyl-5-cyclopentenyl, 3,4- dichloro-5-cyclopentenyl, 5-(tert-butyl)-1-cyclopentenyl, 1-cyclohexenyl, 3-methyl-1-cyclohexenyl, 3,4-dimethyl-1-cyclohexenyl; and cyano lower alkyl such as cyanomethyl, beta-cyanoethyl, gamma-cyanopropyl, delta-cyanobutyl, and gamma-cyanoisobutyl; $R^3$ can be hydrocarbyl, halohydrocarbyl and cyano alkyl such as those listed above for $R^2$; $R^6$ can be selected from the same group as $R^2$ and in addition can be halo, cyano, nitro, carboxy ester, acyl and substituted hydrocarbyl containing halo, cyano, nitro, carboxy ester and acyl, the substituted hydrocarbyl can be derived from those hydrocarbyl listed above for $R^2$ and the hydrocarbyl portion of the caroxy ester and the acyl can also be selected from the hydrocarbyl listed above for $R^2$; $R^7$ is slected from the group consisting of hydrogen, hydrocarbyl having not more than about 8 carbon atoms selected from the group of hydrocarbyl set forth in the definition of $R^2$; halohydrocarbyl having not more than about 8 carbon atoms selected from the group of halohydrocarbyl set forth in the definition of $R^2$; acyl having not more than about 8 carbon atoms, the hydrocarbyl portion of which is selected from the group of hydrocarbyl set forth in the definition of $R^2$. In addition, $R^7$ when taken together with $R^3$ can form together with the carbon atoms to which they are attached cyclichydrocarbon substituents of not more than about 12 carbon atoms and chloro, nitro, acyl, cyano and carboxy ester substituted cyclic hydrocarbon substituents, the hydrocarbyl portion of the carboxy ester and acyl can be selected from the hydrocarbyl listed above for $R^2$; X can be hydrocarbyl, halohydrocarbyl and cyanoalkyl such as those listed above for $R^2$. In addition, X can be a radical having not more than 8 carbon atoms selected from the group consisting of alkoxy, haloalkoxy, and cyanoalkoxy and amine. The groups represented by X can be methoxy, ethoxy, butoxy, propoxy, pentoxy, heptoxy; haloalkoxy such as choromethoxy, iodomethoxy, bromomethoxy, fluoromethoxy, chloroethoxy, iodioethoxy, bromethoxy, fluoroethoxy, trichloromethoxy diiodoethoxy, dibromomethoxy, trifluoromethoxy, dichloroethoxy, chloro-n-propoxy, bromo-n-propoxy, iodoisopropoxy, bromo-n-butoxy, bromo-tert-butoxy, 1,3,3-trichlorobutoxy, 1,3,3-tribromobutoxy, chloropentoxy, bromopentoxy, 2,3-dichloropentoxy, 3,3-dibromopentoxy, chlorohexoxy, bromohexoxy, 2,4-dichlorohexoxy, 1,3-dibromohexoxy, 1,3,4-trichlorohexoxy, chlorohexoxy, choroheptoxy, bromoheptoxy, fluoroheptoxy, 1,3-dichloroheptoxy, 1,4,4-trichloroheptoxy, 2,4-dichloromethylheptoxy, chlorooctoxy, bromooctoxy, iodooctoxy, 2,4-dichloromethylhexoxy, 2,4-dichlorooctoxy, 2,44-trichloromethylpentoxy, 1,3,5-tribromooctoxy; the cyanoalkoxy can be cyanomethoxy, beta-cyanoethoxy, gamma-cyanopropoxy, deltacyanobutoxy, gamma-cyanoisobutoxy, beta-cyanopropoxy and alpha-cyanobutoxy, the hydrocarbyl portions of the amines can be selected from the group defined by $R^2$ and the amine can be, for example, diethyl amine, methyl amine, diisopropylamine, octyl amine, and ethyl butyl amine.

Examples of titanium chelate catalysts of formula (1) include the following:

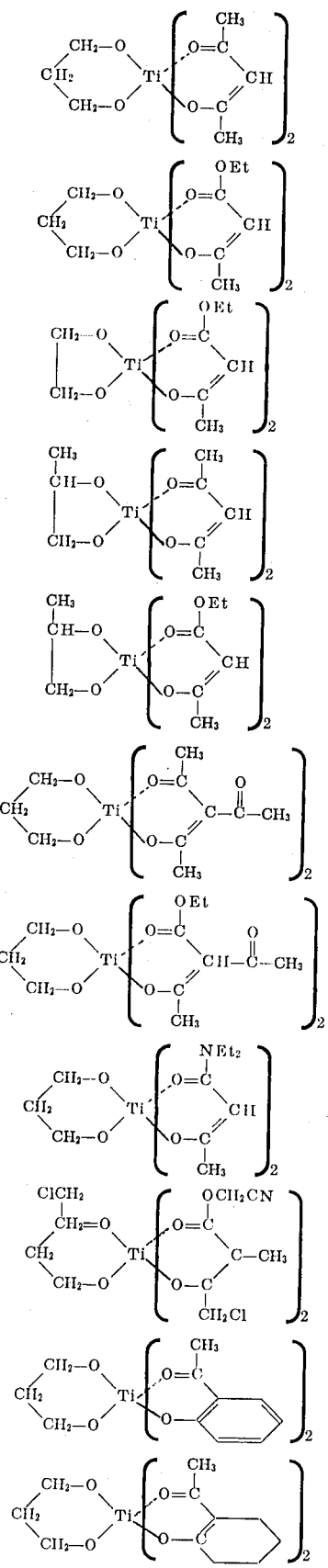

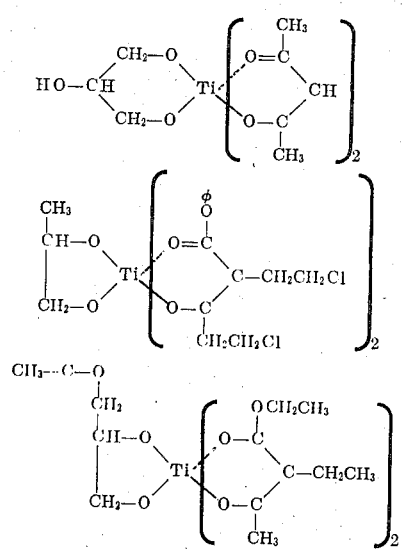

The alkanedioxy titanium chelates of the present invention can be prepared first by adding a beta-dicarbonyl compound such as a beta-diketone or a beta-ketoester to a titanium or the ester of a lower aliphatic alcohol. This reaction is represented by the following equation:

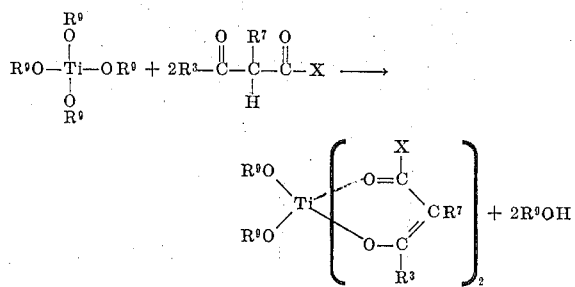

Preferably, two moles of the beta-dicarbonyl compound are used per mole of titanium compound. Toluene is the preferred solvent, preferably used to the extent of from 0.5 parts to 10 parts per part of alkyl titanate. In the above formula, $R^9$ is a lower alkyl radical having 1 to 8 carbon atoms and $R^3$, $R^7$ and X are as previously defined. It is preferred that stoichiometric quantities of reactants be employed as this avoids the problem of removing unreactive starting material.

The second step of the preparation involves the reaction of the dialkoxy titanium chelate preparation of which is described above with an alkanediol. This reaction is illustrated by the following equation:

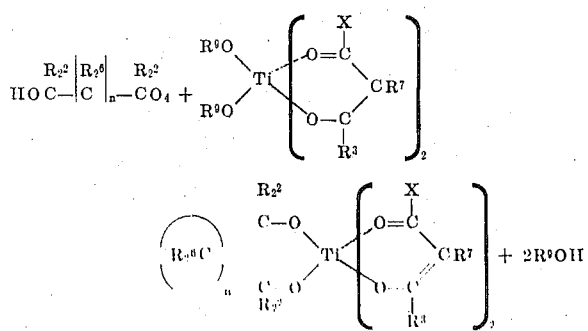

In the above formulas, $R^2$ and $R^6$ are as previously defined. Again, it is preferred that the quantities of reactants be stoichiometric. If an excess of the alkanediol is employed only one of the hydroxyl groups of some of the diol will react with the titanium by alkoxy interchange to form hydroxyalkoxy-substituted titanates. In addition to the desired product, the alkoxy exchange reaction employing the diol also can lead to the formation of minor amounts of polymeric materials where one hydroxy of the diol will react with one titanium chelate and the second hydroxy will react with the second titanium chelate to form a dimer. Trimer and tetramer formation can also occur in this manner. The use of large quantities of solvent such as from 2 to 20 parts of toluene per part of the chelated dialkyl titanates tends to dimish trimer and tetramer formation.

It is preferred that when the dicarbonyl compound is a lower alkyl ester of acetoacetic acid that the temperature be maintained below 70°C. The preferred dicarbonyl compound is a lower alkyl eser of acetoacetic acid. The alkyl group can be straight chain or branched. The preferred group of acetoacetates include methylacetoacetate, ethylacetoacetate, propylacetoacetate, isobutylacetoacetate, pentylacetoacetate, hexylacetoacetate, heptylacetoacetate, and octylacetoacetate. The preferred acetoacetate is ethylacetoacetate. It is also preferred that $R^9$ be an isopropyl radical as this via alkoxy interchange produces isopropyl alcohol. The isopropyl alcohol can then be distilled off using toluene as the azeotroping agent in both of the above-described reactions.

The use of a solvent is not necessary but is preferred. Solvents other than toluene which can be employed include benzene, xylene, hexane or any other of the well known solvents useful for the azeotropic removal of formed alcohol from solution.

EXAMPLE 1

Ethylacetolacetate (268 parts) was added to 294 parts of tetraisopropyltitanate with stirring over a period of 2 hours. Stirring of this slightly exothermic reaction for an additional 2 hours was followed by removal of the formed isopropyl alcohol by distillation. A rapid addition of 78.5 parts of 1,3-propanediol to the resulting diisopropyltitanium bis(ethylacetoacetate) was carried out and then this reaction mixture was allowed to stir at ambient temperature for 3 hours. Next a slow distillation was carried out using temperatures of 61° to 68°C, a heated Vigreaux column and a slight vacuum to remove the formed isopropyl alcohol and to shift the equilibrium in favor of the desired product. Toward the end of the distillation, 80 parts of anydrous tenzene was added to distill off residual amounts of isopropyl alcohol and finally high vacuum stripping was employed. The resulting product (388 parts) was a yellowish, orange non-transparent viscous liquid at room temperature and a non-viscous liquid at 67°C. Infrared and nuclear magnetic resonance spectra were consistent with the proposed structure. The product was found to have a molecular weight of 437, the elemental analysis showed carbon 47.6 percent, hydrogen 6.6 percent and titanium 12.4 percent as opposed to a theroretical carbon of 47.4 percent, hydrogen 6.3 percent and titanium 12.60 percent. The product has the formula,

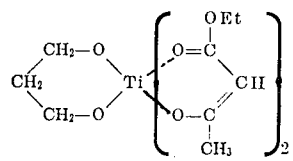

One hundred parts by weight of a mixture, containing 100 parts of a 10,000 centipoise hydroxy endblocked dimethylpolysiloxane fluid, 15 parts of trimethylsiloxane terminated polydimethylsiloxane fluid and 20 parts of octamethylcylcotetrasiloxane treated fumed silica was mixed with 5.1 parts of methyltrimethoxysilane, 0.93 parts of 1,3-propanedioxytitanium bis(ethylacetoacetate) of the formula shown above, and 1.0 parts of acetonitrile. Thr resulting RTV composition had a tack free time of 3-½ hours and showed no change in viscosity or cure rate with aging. Cured sheets of this RTV composition were found to have a tensile of 380 psi, an alongation of 350 percent and a durometer of 27. Extensive studies of the above RTV composition and of similar RTV compositions containing 1,3-propanedioxytitanium bis(ethylacetoacetate) have disclosed that such systems cause absolutely no corrosion to brass.

EXAMPLE 2

The 1,3-propanedioxytitanium bis(acetylacetonate) of the present example was prepared by the following procedure. To 350 parts of tetraisopropyltitanate was added 246 parts of acetylacetone with stirring over a period of 2 hours. Stirring of this slightly exothermic reaction mixture for 16 hours at ambient temperatures was followed by removal of the formed isopropyl alcohol by distillation under reduced pressure. A rapid addition of 94 parts of 1,3-propanediol was carried out, and then, the mixture was stirred at 68°–87°C for 2 hours. A slow distillation was carried out using a slight vacuum, a heated Vigreaux column and temperatures of 75°–84°C to remove the formed isopropyl alcohol and to shift the equilibrium in favor of the desired product. Finally, a high vacuum stripping was employed to remove residual amounts of isopropyl alcohol and excess reactants.

A nearly quantitative yield of the dark reddish, viscous product (382 parts) was obtained. Infrared and nuclear magnetic resonance spectra of the product were consistent with the proposed structure and vapor phase osmometry measurements disclosed that the product had a molecular weight of 410.

One hundred parts by weight of a 10,000 centipoise hydroxyl endblocked polydimethylsiloxane fluid was mixed with 15 parts of trimethylsiloxane endblocked polydimethylsiloxane fluid as a plasticizer, and 20 parts of octamethylcyclotetrasiloxane treated finely divided fumed silica. 100 parts of this base was then mixed with 4.2 parts of methyltrimethoxysilane, 1.0 parts of the 1,3-propanedioxytitanium bis(acetylacetonate) dissolved in 1.6 parts of acetonitrile. The resulting RTV composition has a fairly constant tack free time of 2 hours, had a good through cure after several days of exposure to atmospheric moisture and showed no change in cure rate or viscosity after accelerated aging at 50°C for 1 month. Cured sheets of the above-described RTV composition were found to have a tensile strength of 300 psi, an elongation of 400 percent and durometer of 27. In addition, the above material was found to have an unprimed peel adhesion of 21 lbs/in. from alclad aluminum with 80 percent adhesive failure. This RTV system was found to cause slight corrosion to brass when tested in accordance with conventional military specifications.

EXAMPLE 3 and 4

A series of comparative studies in which four different RTV compositions, differing only in the titanium chelate catalyst, has been carried out. A base mixture, which consisted of 100 parts of 10,000 centipoise hydroxy endblocked dimethylpoysiloxane fluid, 15 parts of trimethylsiloxy terminated polydimethylsiloxane fluid and 20 parts of octamethylcyclotetrasiloxane fumed silica was used for each RTV composition. The RTV composition in each case were comprised of 100 parts of the above-described base compound, 4 parts of methyltrimethoxysilane, 1.02 parts of acetonitrile and 2.74 m mole per 100 grams of base compound of one of the following titanium chelates: 1,3-propanedioxytitanium bis(ethylacetoacetate) (I), diisopropoxytitanium bis(ethylacetoacetate) (II), 1,3-propanedioxytitanium bis(acetylacetonate) (III) and diisopropoxytitanium bis(acetylacetonate) (IV). The factors determined for each RTV composition were cure rate, application rate and viscosity all as a function of time from immediately after catalyzation up to 4 weeks. Also, the physical properties of cured sheets were measured for each RTV composition. The findings of this comparative study are summarized in Tables I and II, whereby the properties of the different RTV compositions are shown.

When a hydroxy terminated polysiloxane, methyltrimethoxysilane and a dialkoxytitanium chelate or an alkanedioxytitanium chelate, are mixed to form an RTV composition, the mixture increases in viscosity to reach a maximum and then decreases in viscosity (increases in application rate) with time until a "final state" is reached. Of the RTV systems studied this very undesirable effect of structuring during and after catalyzation was found to be significantly smaller with the 1,3-propanedioxytitanium chelates (I, III). Also, the rate at which the RTV composition passed through this structured state or maximum viscosity was much greater with the alkanedioxytitanium chelates (I, III). The viscosities immediately after catalyzation and after the RTV has reached a "final state" were less with the 1,3-propanedioxytitanium chelates (I,III) then the corresponding viscosities of the RTV systems with the diisopropoxytitanium chelates (II,IV). An additional significant difference is seen in a comparison of the tensile strengths of elastomers prepared using the 1,3-propanedioxy chelates (I,III) and the isopropoxytitanium chelates (II,IV). The materials prepared according to the teachings of the present invention have tensile strengths approximately double those comparatively tested. In additon, as shown in Table 1, the application rates of RTV's made using chelates I and III are many times greater than chelates II and IV. This increase in application rate is of considerable practical significance since it represents the maximum rate at which the RTV can be applied from a conventional container under standard conditions.

TABLE I

| Titanium chelate | | Application rate, [a] grams/min. after time of -- | | | | | Viscosity,[b] 1×10⁶ cps. after time of | | | | |
|---|---|---|---|---|---|---|---|---|---|---|---|
| | | 0 hrs. | 24 hrs. | 48 hrs. | 1 wk. | 4 wks. | 0 hrs. | 24 hrs. | 48 hrs. | 1 wk. | 4 wks. |
| 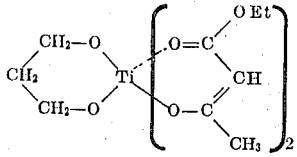 | (I) | 84.0 | 203 | 205 | 200 | 221 | 8.3 | 0.61 | 0.56 | 0.60 | 0.55 |
| 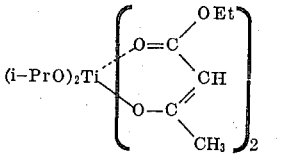 | (II) | 1.4 | 19.2 | 21.7 | 33.7 | 329 | >32 | 9.5 | 6.3 | 3.4 | 3.6 |
| 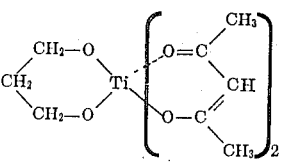 | (III) | 10.3 | 120 | 135 | 135 | 138 | 23 | 3.2 | 1.7 | 1.8 | 1.7 |
| 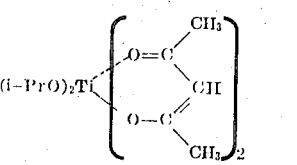 | (IV) | 3.3 | 2.8 | 6.3 | 18.6 | 42.1 | 31 | 29 | 22 | 9.9 | 4.5 |

[a] The application rates were determined using a ⅛ inch orifice and 90 lbs. of inert gas pressure.
[b] A Brookfield HBF Viscometer and No. 7 spindle were used for all viscosity measurements.

TABLE II

| Titanium chelate | | Physical properties of cured sheets | | | Cure rate, tack free time after 1 wk. aging—hrs. |
|---|---|---|---|---|---|
| | | Tensile (lbs./in.²) | Elongation (percent at break) | Durometer (Shore A) | |
| 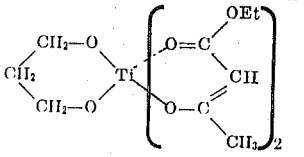 | (I) | 427 | 440 | 29 | 1 |
| 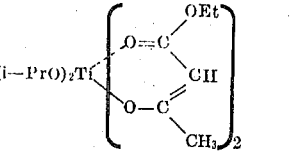 | (II) | 258 | 420 | 25 | 3½ |
| 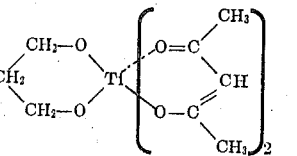 | (III) | 424 | 430 | 29 | 2½ |
| 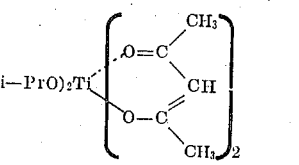 | (IV) | 188 | 384 | 30 | 1½ |

The diisopropoxytitanium bis(ethylacetoacetate) of formula (II) and the diisopropoxytitanium bis(acetoacetate) of formula (IV) are known compositions of matter. The 1,3-propanedioxytitanium bis(ethylacetoacetate) was prepared by the procedure set forth in Example 1.

The 1,3-propanedioxytitanium bis(acetoacetate) of formula (III) was prepared by the procedure described in Example 2.

EXAMPLE 5

220 parts of acetylacetone was added slowly over a period of 2 hours with stirring to 313 parts of tetraisopropyltitanate. Stirring this slightly exothermic reaction mixture at ambient temperatures of 20 hours was followed by removing the formed isopropyl alcohol by distillation under reduced pressure. To the resulting diisopropoxytitanium bis(acetylacetonate) was added 85 parts of 1,2-propanediol and then the mixture was allowed to stir for 18 hours at room temperature. A slow distillation was carried out using temperatures of 94°–121°C and a slight vacuum to remove the formed isopropyl alcohol and to drive the transalkoxylation towards completion. A final high vacuum stripping was employed to remove residual amounts of isopropyl alcohol and excess reactants. A total of 321 parts (91 percent yield) of a reddish-black, very viscous liquid was obtained. The material was found to have a molecular weight of 760, and nuclear magnetic resonance and infrared spectra were consistent with the proposed structure of 1,2-propanedioxytitanium bis(acetylacetonate).

EXAMPLE 6

220 parts of ethylacetoacetate was added dropwise with stirring over a period of 2 hours to 240 parts of tetraisopropyltitanate. Stirring of this slightly exothermic reaction mixture for two hours at ambient temperatures was followed by removal of the formed isopropyl alcohol by distillation using a slight vacuum and temperatures of 65°–77°C. A rapid addition of 53 parts of 1,2-ethanoldiol was carried out, and then the mixture was stirred at room temperature for 3 hours. Next, a slow distillation was carried out using temperatures of 60°–70°C, a heated Vigreaux column and a slight vacuum, to remove the formed isopropyl alcohol and to drive the reaction towards completion. Toward the end of the distillation, 80 parts of anhydrous benzene was added to azeotrope off residual amounts of isopropyl alcohol. Finally, a high vacuum stripping ws employed to remove residual amounts of benzene, isopropyl alcohol and excess reactants. The resulting product (285 parts) was a light yellow, viscous liquid. Infrared and nuclear magnetic resonance spectroscopy were used to characterize the product as being primarily 1,2-ethanedioxytitanium bis(ethylacetoacetate).

What we claim is:

1. A titanium chelate of the formula:

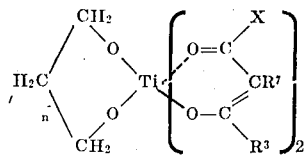

wherein $R^3$ is a methyl radical, $R^7$ is selected from the group consisting of hydrogen, hydrocarbyl having not more than about 8 carbon atoms, halohydrocarbyl having not more than about 8 carbon atoms, acyl having not more than about 8 carbon atoms, and taken together with $R^3$ forms together with the carbon atoms to which they are attached cyclic hydrocarbon substituents of not more than about 12 carbon atoms and chloro, nitro, acyl, cyano and carboxy ester substituted cyclic hydrocarbon substituents, X is a radical selected from the class consisting of radicals having not more than about 8 carbon atoms selected from the group consisting of alkoxy, haloalkoxy, cyanoalkoxy and amide, and $n$ has a value of 0 to 8.

2. The composition of claim 1 further characterized by X being $-OC_2H_5$ and n having a value of zero or 1.

3. The composition of claim 1 further characterized by the titanium chelate being:

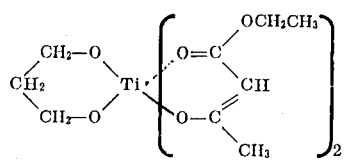

* * * * *

UNITED STATES PATENT AND TRADEMARK OFFICE
CERTIFICATE OF CORRECTION

PATENT NO. : 3,856,839
DATED : December 24, 1974
INVENTOR(S) : Stanley D. Smith and Stephen B. Hamilton, Jr.

It is certified that error appears in the above-identified patent and that said Letters Patent are hereby corrected as shown below:

Column 12, lines 11-17, the formula should be

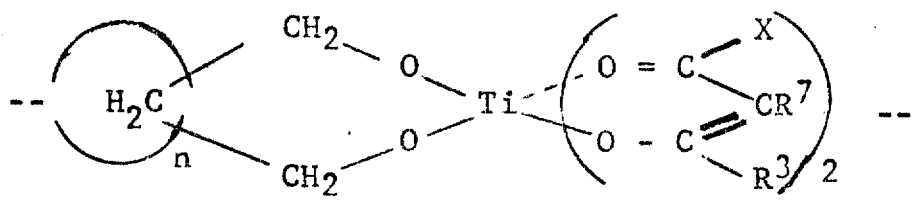

Signed and sealed this 15th day of July 1975.

(SEAL)
Attest:

RUTH C. MASON
Attesting Officer

C. MARSHALL DANN
Commissioner of Patents
and Trademarks